(12) United States Patent
Johl et al.

(10) Patent No.: US 12,307,566 B2
(45) Date of Patent: May 20, 2025

(54) SYSTEMS AND METHODS FOR CREATING AVATARS

(71) Applicants: Daljit Singh Johl, Yuba City, CA (US); Ian Dixon, Sacramento, CA (US); Gabriel Di Sante, Toronto (CA)

(72) Inventors: Daljit Singh Johl, Yuba City, CA (US); Ian Dixon, Sacramento, CA (US); Gabriel Di Sante, Toronto (CA)

(73) Assignee: Bao Tran, Saratoga, CA (US)

( * ) Notice: Subject to any disclaimer, the term of this patent is extended or adjusted under 35 U.S.C. 154(b) by 374 days.

(21) Appl. No.: 18/070,881

(22) Filed: Nov. 29, 2022

(65) Prior Publication Data
US 2024/0177388 A1   May 30, 2024

(51) Int. Cl.
| | | |
|---|---|---|
| G06T 19/00 | (2011.01) | |
| A63F 13/52 | (2014.01) | |
| A63F 13/655 | (2014.01) | |
| G06F 21/34 | (2013.01) | |
| G06K 9/00 | (2022.01) | |
| G06Q 30/00 | (2023.01) | |
| G06T 7/55 | (2017.01) | |
| G06T 7/70 | (2017.01) | |
| G06T 13/40 | (2011.01) | |
| G06T 19/20 | (2011.01) | |

(52) U.S. Cl.
CPC .............. *G06T 13/40* (2013.01); *A63F 13/52* (2014.09); *A63F 13/655* (2014.09); *G06F 21/34* (2013.01); *G06T 7/55* (2017.01); *G06T 7/70* (2017.01); *G06T 19/20* (2013.01); *A63F 2300/8082* (2013.01); *G06T 2207/30196* (2013.01); *G06T 2207/30244* (2013.01); *G06T 2219/2016* (2013.01)

(58) Field of Classification Search
CPC ......... G06T 17/20; G06T 19/00; G06T 13/40; G06Q 30/0623; G06Q 30/0643; G06F 3/011; G06F 3/017; G06F 3/0304; G06F 3/04815; G06V 20/64; G06V 40/10; A63F 13/213; A63F 13/655; A63B 2071/0636; A63B 2210/06; A63B 2220/05; A63B 2220/833; H04N 13/275; H04N 2005/2726; H04N 1/622; A47B 67/005; A47F 2007/195; A47G 1/02; G02B 5/08; G06N 20/00; G09G 2354/00
See application file for complete search history.

(56) References Cited

U.S. PATENT DOCUMENTS

| | | | |
|---|---|---|---|
| 9,835,773 B2 | 12/2017 | Zhang | |
| 10,282,914 B1 | 5/2019 | Tran | |
| 10,702,216 B2 | 7/2020 | Sareen | |
| 2014/0168217 A1* | 6/2014 | Kim | G06Q 30/0643 345/420 |
| 2017/0296874 A1* | 10/2017 | Zamir | A61B 5/7271 |

(Continued)

*Primary Examiner* — Lawrence S Galka
(74) *Attorney, Agent, or Firm* — PatentPC PowerPatent; Bao Tran

(57) ABSTRACT

A system includes a kiosk with a mirror display; a depth camera coupled to the display; a touchscreen sensor coupled to the display; a proximity sensor; a radio frequency identification (RFID) module; and a processor coupled to the mirror display, the depth camera, the touchscreen sensor, the proximity sensor, and the RFID module to interact with a user; and a module executed by the processor to generate a dimensionally accurate body avatar.

19 Claims, 7 Drawing Sheets

(56) References Cited

U.S. PATENT DOCUMENTS

| | | |
|---|---|---|
| 2018/0033089 A1 | 2/2018 | Goldman |
| 2020/0261794 A1* | 8/2020 | Patuto ................... A63F 13/213 |
| 2023/0071274 A1* | 3/2023 | Trehan ................... G06F 3/167 |
| 2023/0115716 A1* | 4/2023 | Palacios ................. G06T 19/20 |
| | | 482/8 |

* cited by examiner

FIG. 6

| |
|---|
| Position body to be avatarized in the kiosk with the mirror display (1000) |
| Capture depth data and images with the depth camera (1010) |
| Rotate body (or rotate camera around body with a motor) while capturing a plurality of depth data and images with the depth camera (1020) |
| Capture 3D point cloud from depth data and images (1030) |
| Use depth data and combine with photogrammetry to create 3D model of face/body (1040) |
|    Select a body template closest matching the body being scanned (1042) |
|    Morph/Warp the body template to the 3D points and fit the body template to the 3D points (1044) |
|    Save the 3D points and extract dimensional data (1046) |
| Create mesh from 3D points (1050) |
| Convert mesh data to dimensionally accurate 3D avatar (1060) |
| Preview 3D avatar to user for approval (1070) |
| Provide 3D avatar to user to share or use to recommend products (1080) |
| Apply recommendation module to dimensionally accurate 3D avatar to select and recommend actions to user, and capture usage metrics such as unique user sessions, dwell time and kiosk interactions; Use a deep learning machine to data from the kiosk that pre aggregates and categorizes data, further comprising analyzing the data by setting filters and data parameters. (1090) |

SYSTEMS AND METHODS FOR CREATING AVATARS

BACKGROUND

The 1992 science fiction novel Snow Crash by Neal Stephenson is the first to mention the term "metaverse". Similar concepts were also discussed in Ernest Cline's "Ready Player One" novel, which was adapted by Steven Spielberg. Both books describe dystopian futures where people try to escape reality by creating virtual worlds.

Recently Facebook recognized the importance of the metaverse by rebranding itself as Meta. E-commerce was one of the first areas that brands explored when the Internet was developing in the 1990s. Companies can now present their products in a metaverse, which offers them new and immersive ways to reach consumers.

One way to enter the metaverse is through digital fashion collections. Brands can even create their own avatars. One example is the Ozworld avatars by Adidas. The creation of the Ozworld avatars requires users to answer several questions about their personality. Based on these answers, a machine learning algorithm selects the most suitable traits. These avatars will work with hundreds of apps and games that support avatars, including the Ready Player Me platform.

Warner Bros. partnered with Yahoo for the premier of the Dune movie to create an AR experience powered by 8th Wall's WebAR technology (now part of Niantic) and built by Aircards. The experience allows fans of the movie to create a 3D avatar wearing outfits from the movie. They can also bring their avatar to life in augmented reality.

There is a need for a way to capture anatomy and share it with others. The avatar could be used in fields like surgery, clothing, footwear and 3D printing.

SUMMARY

A system includes
a kiosk including:
  a mirror display;
  a depth camera coupled to the display;
  a touchscreen sensor coupled to the display;
  a proximity sensor;
  a radio frequency identification (RFID) module; and
  a processor coupled to the mirror display, the depth camera, the touchscreen sensor, the proximity sensor, and the RFID module to interact with a user; and
a module executed by the processor to generate a dimensionally accurate body avatar.

In another aspect, a method to create an engaging avatar with a registration kiosk is detailed. The application will be unity based, and incorporate a depth camera such as the Intel RealSense or Microsoft Kinect camera system. Users will be able to complete a registration or start a new registration from scratch and generate a customized avatar. Users will be able to log in using credentials or by scanning a unique QR code from the kiosk. Once authenticated, users will be prompted to create their avatar, and the depth camera to create an accurate representation of the user's face or body and replicate that onto the avatar for use in the platform. Once created, users will be able to use the depth camera and body tracking to view and control their avatar on screen. Once complete, users will be able to upload their avatar to the platform as well as send themselves a sharable image of the avatar.

Implementations of the system may include one or more of the following. The system automatically detects a proper scan posture and captures multiple depth images. Also, the system processes them to obtain accurate 3D whole-body contours instantaneously.

Other implementations of the platform feature a web-based backend for metric aggregation, health monitoring, and updating attract loops and other marketing content.

Advantages of the system may include one or more of the following. The system provides a convenient way to generate body realistic avatars that can then be used in the metaverse and for online purchases. The kiosk transforms the in-store shopping excursion into a rewarding shopping and social event. For example, for clothing e-commerce, clothing garments are dynamic and automatically adjust to the size of the customer on the screen. Garments can also be layered; for example, a top from one company can be shown with a trouser from another company. A fitting module can be accessed from the interface for accurate sizing of garments selected on the mirror. The fitting module supports a more accurate selection of garments sizes to reduce the frustrations of wrong size returns for the customer and online retailer. The size recommendations are based upon size parameters provided by the brand and/or merchant. A learning machine can automate the recommendations based on historical fitting, user profile, user body data, and historical purchase patterns, for example. Once "the look" has been achieved, the image can be shared with family and friends on social media directly from the screen. All items are displayed together with the price, complementary offers, instant purchase instructions along with the ability to share via Social Media platforms. Regular customers can log into their own personal 'online store', and recommendations will be made based on previous purchases for a more personal shopping experience. Purchase can then be made immediately on the Kiosk or Online. Retailers can use the Virtual Mirror as a platform to provide shoppers with expert fashion advice and recommendations to increase sales and customer loyalty. Buyers can view a greater range of outfits than may be available in the store. The buyer can also get fashion advice and recommendations online from the retailer. Shopping is made fun and social by shoppers capturing photos of themselves in different virtual outfits and sharing with friends and family via photo sharing through social networks.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 6-7 show exemplary methods executed by the system of FIGS. 1-2.

DETAILED DESCRIPTION

Figure 1:
FIGS. 1-2 show an exemplary kiosk that can generate user avatars.
Figure 2:
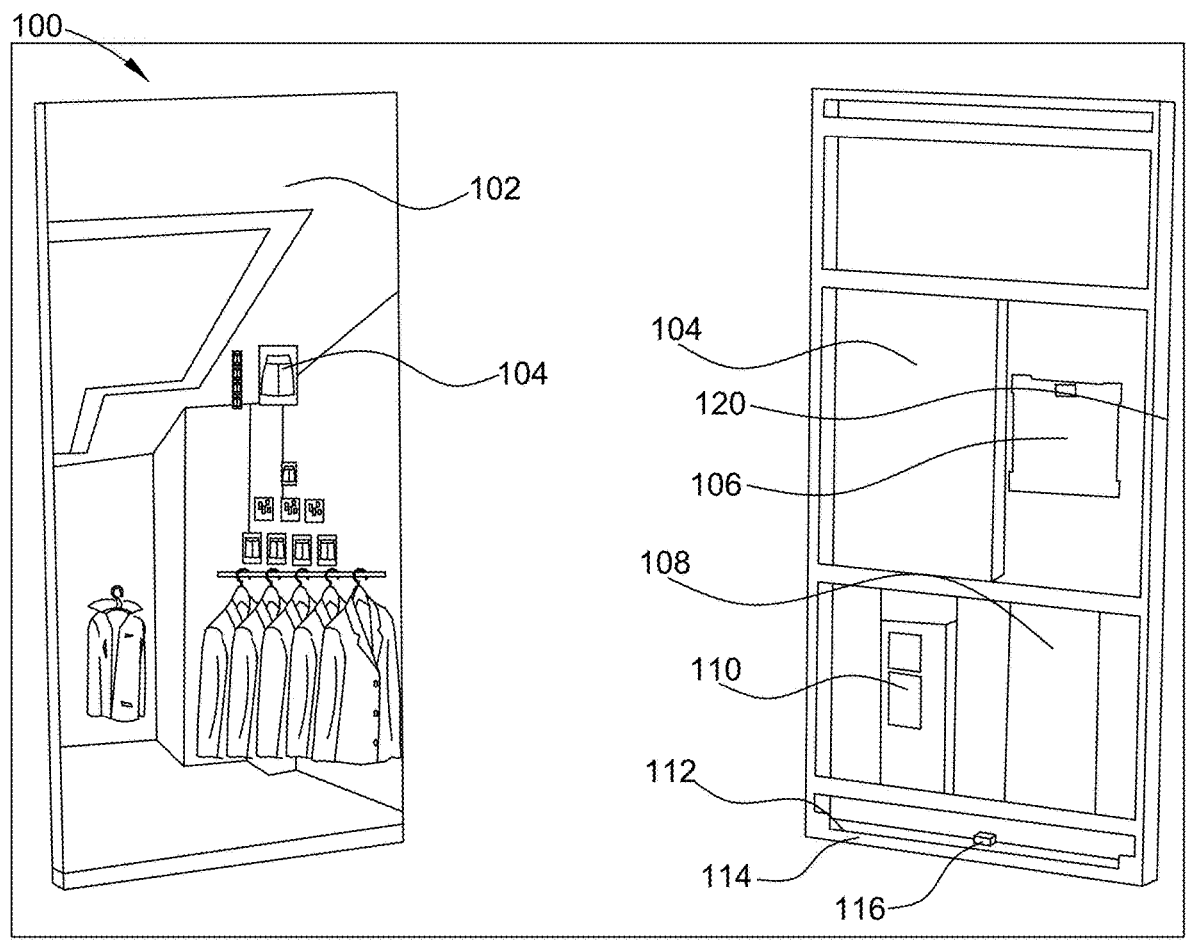
Figure 3:
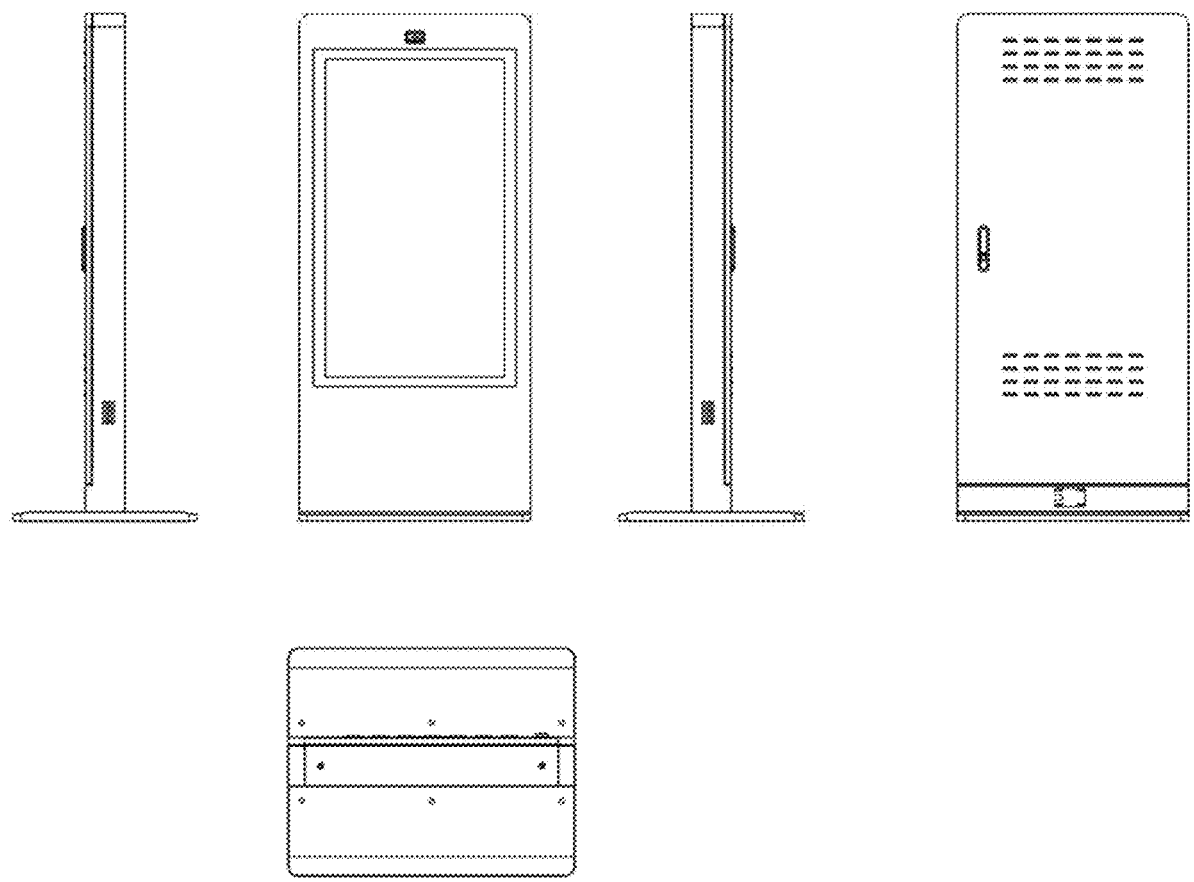
FIG. 3 shows another exemplary kiosk that can generate user avatars.

The system includes an interactive mirror with a touchscreen, computer, and a mirror. To provide for interactivity that can detect customers and auto-load items, proximity sensors and a RFID antenna hardware is provided. A depth-sensing camera is used to provide dimensionally accurate detection and then applying 3D modeling on the user data to create the avatar. The display is high-bright and optically bonded to the mirror with the touch screen as a nearly invisible integration with crisp content and brilliant colors.

The depth camera(s) scan the user in three dimensions. Some systems, for example, can estimate the depth of a person's body by simultaneously taking images with multiple image capture devices. A structured light source or a laser solution can be used. Preferably, one embodiment uses a depth camera such as the Intel RealSense cameras or Microsoft's Kinect camera.

The Intel 3D camera can scan the environment from 0.2 m to 1.2 m. Its lens has a built in IR cut filter. The video camera has a frame rate up to 60 fps with a 90° FOV, moreover its lens has an IR Band Pass filter. The IR laser integrates an infrared laser diode, low power class 1, and a resonant micro-mirror. The 3D camera can provide skeletal and depth tracking and may gather spatial data that describes objects located in the physical environment external to the depth sensor (e.g., the user's bath room). The skeletal and depth tracking technology may be implemented in a depth sensor (e.g., the Kinect, the Intel Realsense), stereo cameras, mobile devices, and any other device that may capture depth data. In some example embodiments, the skeletal and depth tracking technology is implemented on a server using algorithms that utilize the RGB and depth channels. In some example embodiments, depth sensing technologies use structured light or time of flight based sensing. For example, an infrared (hereinafter, also "IR") emitter that is part of the preference analysis machine 310 and that is located in the user's living room, may project (e.g., emit or spray out) beams of infrared light into surrounding space. The projected beams of IR light may hit and reflect off objects that are located in their path (e.g., the user or a physical object in the user's living room). A depth sensor (e.g., located in the user's living room) may capture (e.g., receive) spatial data about the surroundings of the depth sensor based on the reflected beams of IR light. In some example embodiments, the captured spatial data may be used to create (e.g., represent, model, or define) a 3D field of view that may be displayed on a screen (e.g., of a TV set, computer, or mobile device). Examples of such spatial data include the location and shape of the objects within the room where the spatial sensor is located. In some example embodiments, based on measuring how long it takes the beams of IR light to reflect off objects they encounter in their path and be captured by the depth sensor, the preference analysis machine may determine the location (e.g., the distance from the depth sensor) of the objects off which the beams of IR light reflected (e.g., the user, a furniture piece, or a wall). In various example embodiments, based on the received spatial data, the system may determine details of the objects in the room, such as spatial measurements of the objects in the room (e.g., the dimensions of the user's body). The camera determines one or more measurements (e.g., dimensions) of the body of the user as part of the analysis of the image and the model. The processor with 3D model information from the user may also determine, based on the measurements of the user's body, one or more sizes of fashion items from different brands (e.g., manufacturers or sellers of fashion items) that may fit the user's body.

One embodiment for clothing includes obtaining a 3D model of a user standing in front of the display and rendering one or more articles or products on the 3D model. Images such as photographs or videos can be made of the user (also referred to as customer or client) when trying on different articles. These images can be seen on the display and can simply be ordered/edited/deleted by the user by "dragging" them across the screen. In this example, the display is designed as a touch screen. In this manner, the articles tried on can be compared more realistically and more easily by the user.

The avatar file can be saved. In one embodiment, the resulting file is saved as a GLB file (.glb), which stands for "GL Transmission Format Binary file", is a standardized file format used to share 3D data. Precisely, it can contain information about 3D scenes, models, lighting, materials, node hierarchy and animations. The GLB format is a version of the GLTF file. The difference is that the GLB format is a binary file format while the GLTF is based on JSON (JavaScript Object Notation). The GLB locates all of the elements of a 3D scene, including materials, node hierarchy and cameras in one single compressed file. In comparison, the GLTF file requires external processing file formats, such as for textures, shaders and animation data. These external elements are stored in the GLTF file, but each in a unique format (JPEG for textures, GLSL for shaders and BIN for animation data). The GLB file can be opened in all major 3D modeling programs (Blender, Autodesk Maya, 3ds Max, SketchUp, Babylon, etc). To create a GLB file of a 3D project directly from the scanner in the kiosk, the system gathers necessary models, lighting, materials, node hierarchy, animations, etc. into a single project file. Once the 3D project is ready, simply export the file directly as a GLB. GLB files encode data in a binary format. It includes a JSON data part (which includes the original information data of the gltf file and its settings) and a binary buffer (to support additional files for example on animations).

The system can capture dimensionally accurate anatomy as an avatar and the user can share it with others. This could be used in fields like surgery, clothing, footwear and 3D printing. Specialized hardware is required to scan the user in three dimensions. Some systems, for example, can estimate the depth of a person's body by simultaneously taking images with multiple image capture devices. This is done by using a known, structured light source or a laser solution, for example.

Interactive mirrors are a way to get new insights and data. Comparable to e-commerce, brick and mortar stores lack data about what really happens in their store locations. The mirror could offer.

- item conversion rate—the percentage of items that are selling or not selling after customer try-on
- Shopping baskets vs. fitting baskets—Most used vs. most purchased
- Maximum number of items per session
- Session duration
- Recommendation conversion rate: How often should items be recommended?
- Staff are available to assist if needed.
- Response time of staff—How long does the store staff take to respond to customer call (gaining actionable insight into customer experience)

Retailers can now offer a more engaging in-store experience with the interactive mirror and enables retailers looking to stand out. Such uses will distinguish themselves from other people and offer their customers. The smart mirror can "wake-up" when customers approach, auto-load products into the user interface and digitally contact sales representatives to render purchase assistance, to name just a few. Retailers benefits may further include:
- Potential for cross-selling and upselling increases
- Creates interactive dialogue between customers and staff in the store
- Display complete range of products (Virtual-Endless-Aisle)
- Retail analytics: Customer insights, Preferences and behavior
- Operational excellence is increased for optimizing the merchandise plan
- Omni-channel Integration of online and offline brick-and-mortar locations
- Higher engagement with brand and store
- Personalized customer offers Consumers benefits may include:
- Different product combinations and styles may be shown
- Make product recommendations
- Product availability check and store locator
- Display full product range to browse
- Additional information, videos, social media integration
- Customer-friendly fitting (Article-Bring-Service)
- Allow digitally supported purchases
- Ordering of products or direct reservation
- Delivery Options (delivery to customer home address from another store, etc.)

In one implementation, the system is a Unity based kiosk application that provides integration with authentication and avatar storage system. Some features include:
- Allow new users to register for an account
- Allow existing users to complete account registration
- Create Readyplayer.me Avatar
  - Use the camera to create a realistic avatar face and body
  - Camera will not be used to scale/modify the avatar body.
- Save avatar to the account
- Avatar Preview
  - View avatar on screen
  - Control avatar movement using depth camera—when the person moves, the avatar will mimic their movement
- Customizable welcome screen attract loop
- Customizable marketing space throughout design
- Web Based Backend Management Platform
  - Content Management
- Edit/Update home screen attract loop
- Edit/Update marketing content for designated spaces within the kiosk
- Kiosk health monitoring
- Constant heartbeat monitoring to ensure kiosk is operational and connected to the internet.
- Kiosk usage metrics will be aggregated into the backend
  - Unique user sessions
  - Dwell Time
  - Kiosk interactions FIG. 6 shows an exemplary process to generate accurate avatars:
- Position body to be avatarized in the kiosk with the mirror display (1000)
- Capture depth data and images with the depth camera (1010)
- Rotate body (or rotate camera around body with a motor) while capturing a plurality of depth data and images with the depth camera (1020)
- Capture 3D point cloud from depth data and images (1030)
- Use depth data and combine with photogrammetry to create 3D model of face/body (1040)
  - Select a body template closest matching the body being scanned (1042)
  - Morph/Warp the body template to the 3D points and fit the body template to the 3D points (1044)
  - Save the 3D points and extract dimensional data (1046)
- Create mesh from 3D points (1050)
- Convert mesh data to dimensionally accurate 3D avatar (1060)
- Preview 3D avatar to user for approval (1070)
- Provide 3D avatar to user to share or use to recommend products (1080)
- Apply recommendation module to dimensionally accurate 3D avatar to select and recommend actions to user, and capture usage metrics such as unique user sessions, dwell time and kiosk interactions (1090)

Figure 7:
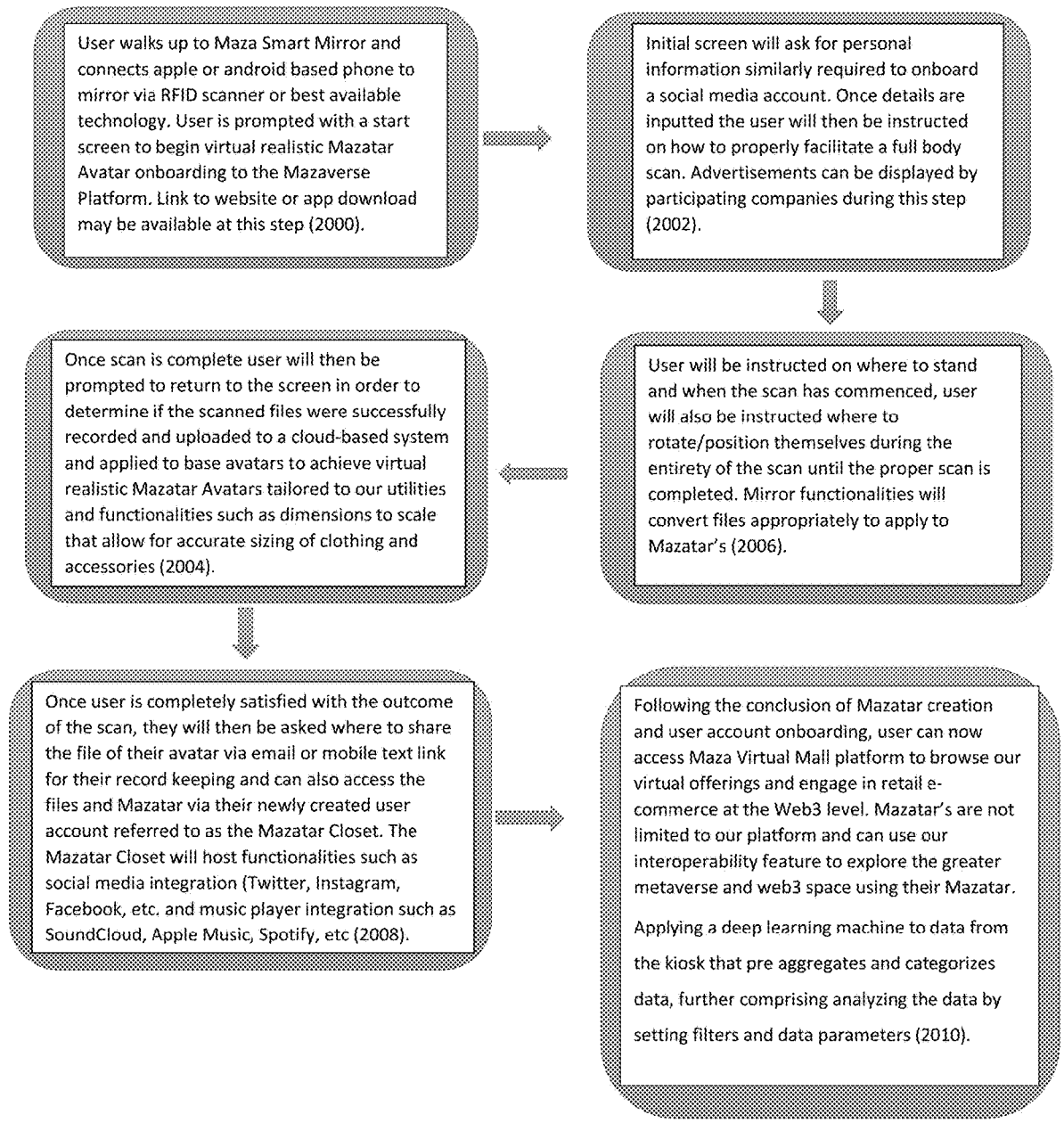

FIG. 7 shows an exemplary smart mirror process for avatar creation. First, a user walks up to a Maza Smart Mirror and connects a smart phone such as an apple or android based phone to the mirror via RFID scanner or available technology. The user is prompted with a start screen to begin virtual realistic Mazatar Avatar onboarding to the Mazaverse Platform. Link to website or app download may be available at this step (2000).

Next, the initial screen will ask for personal information similarly required to onboard a social media account. Once details are inputted the user will then be instructed on how to properly facilitate a full body scan. Advertisements can be displayed by participating companies during this step (2002).

Once scan is complete user will then be prompted to return to the screen in order to determine if the scanned files were successfully recorded and uploaded to a cloud-based system and applied to base avatars to achieve virtual realistic Mazatar Avatars tailored to our utilities and functionalities such as dimensions to scale that allow for accurate sizing of clothing and accessories (2004).

User will be instructed on where to stand and when the scan has commenced, user will also be instructed where to rotate/position themselves during the entirety of the scan until the proper scan is completed. Mirror functionalities will convert files appropriately to apply to Mazatar's (2006).

Once user is completely satisfied with the outcome of the scan, they will then be asked where to share the file of their avatar via email or mobile text link for their record keeping and can also access the files and Mazatar via their newly created user account referred to as the Mazatar Closet. The Mazatar Closet will host functionalities such as social media integration (Twitter, Instagram, Facebook, etc. and music player integration such as SoundCloud, Apple Music, Spotify, etc (2008).

Following the conclusion of Mazatar creation and user account onboarding, user can now access Maza Virtual Mall platform to browse our virtual offerings and engage in retail e-commerce at the Web3 level. Mazatar's are not limited to our platform and can use our interoperability feature to explore the greater metaverse and web3 space using their Mazatar (2010).

In one embodiment, to create an avatar the system takes digital photos of the consumer's body using a depth camera, a webcam, or any other digital camera. Three or more photographs (front, back, and side) are required to create an avatar. The digital photos can be sent to the avatar software. A mask can be applied to digital photographs to remove all other objects from the image. The base avatar mesh is sculpted. The digital photos are used as references to match the avatar's face and/or body shape to those of the user or person. These photographs can then be mapped to planes and placed around the mesh of the base avatar. It is possible to refer to photographs to determine the shape of the body being digitally reproduced. If the photo is front-facing, the mesh of the base avatar is also front-facing. The base avatar's shape targets are then adjusted to match the silhouette in the reference image. Next, the mesh of the base avatar is adjusted using soft selection techniques to ensure that the dimensions and references are accurately matched. To correct any errors in the photographs, digital adjustments are made to the photographs of the back, sides, and front of the body when using them as references.

In one implementation, Ready Player Me supports full-body avatars. Full-body avatars are represented by a complete 3D model, in contrast to half-body avatars for VR applications consisting of a head and hands.

Both full and half-body avatar data are saved in a single binary GLB asset. The contents of the GLB asset include everything that's needed to render the avatar: meshes, textures, blend shapes, skeletal rig, and PBR materials. The avatar data is available via a unique URL as a .glb file that can be fetched or downloaded.

In one example, the process for deploying the avatar with Unity is as follows:
 Create the Avatar with the Kiosk
 Load Avatars with the Avatar Loader Window
 Launch the Avatar Loader Window by choosing Ready Player Me>Avatar Loader.
 Find the Avatar Url or Short Code text box below the banner.
 Paste avatar URL
 Optionally, check Use Eye Animations.
 Optionally, check Voice To Animation.
 Click Load Avatar.
 Avatar loads as Prefab into the current scene.
 If necessary, adjust the Scene.
 If the Avatar looks pixelated, slide Scale to 1.
 Adjust the camera in the Scene, e.g. closer to the Avatar.
 Change Scene Lighting
 Optionally, rotate the avatar for desired view angle.
 Run clothing draping software to show how clothing is worn over the body. The avatar performs an animation and an overlay displaying runtime data.

In one embodiment, the system can be used as a 3D Virtual Test-On of Apparel on an Avatar. The system can provide virtual fitting of the 3D virtual clothing onto a consumer avatar to determine a consumer virtual fi. The consumer can choose to virtual try-on the 3D virtual garment. Tyeshe user can upload her avatar to a 3D Virtual Garment Try Out module. One implementation provides fitting as a service where the user clicks on a hyperlink or QR code to upload the avatar gb3 file and accesses the application service provider (ASP) which can communicate with the retailer or computing device. It may also run 3D virtual fitting software. Each request includes data that identifies the user. If the user is not listed in the asp-model, the user will be prompted to create a profile or sign-in with the ASP. The ASP is available as an online service for consumers or retailers over a network connection. The 3D virtual try-on system could be available at the retailer, or hosted by a third-party web server. Another embodiment of 3D virtual fitting software 900 can be run on kiosk itself. A user can click on a link, a button using a mouse, or interact via touch screen on display of the kiosk. The result of the 3D virtual test-on process can be seen by the user on 3D viewer application. The system determines if the correct size has been established for the consumer. If it is, processing proceeds to the recommendation step. Otherwise, processing will perform size prediction algorithm.

Step 608: Consumer's body measurements and other data 176 are retrieved from avatar processing 160. These measurements are compared with 3D virtual clothing measurements 184 at the corresponding points. For each size of production sample garment, the root mean square (rms), of the deviations from these two sets (body measurements 176 and 3D virtual garment 184) are calculated.

Step 610 determines whether the size with the lowest RMS value is adequate to make an initial guess. For those who are skilled in statistical analysis, chi-squared and other statistical tests can be used to evaluate the strength of an initial guess. This may depend on how accurately the consumer avatar 161 replicates the size, shape, and proportion of the consumer body 22. The user can also determine whether the initial guess is adequate. If the initial guess is correct, processing will move to step 614. The initial guess of the 3D Virtual Garment 183 will be queued to be a virtual fit on the consumer avatar 161. Otherwise, processing proceeds to step 612 in which multiple sizes of the 3D virtual garment 183 are waiting for virtual fitting on consumer avatar 161.

The user can also choose to try on virtual garments with other garments they already have tried.

Processing involves virtual fitting 3D virtual garment 183 on an avatar. On avatar, the existing fit model virtual fit can be loaded. The virtual fit process can then be continued to adjust for the differences between the avatars. The end result is consumer virtual fit. The hardware required to process cloth simulations in 3D environments may be expensive. For 3D graphics simulation, GPUs will be preferred by those who are skilled in the art. When GPU is not available, other CPUs can be used in their place. One embodiment allows GPUs 1002 and CPUs to be used in parallel to speed up simulation processing through multi-threading, provided that the processor supports it.

Processing may also include simulating animation. An animation file is created in such cases. An animation file can contain a consumer avatar 161 performing any human movement, such as walking, running, or dancing. Each frame of animation is virtual fit and stored in consumer virtual fit 112.

Next, a fit analysis algorithm is detailed to determine qualitative as well as quantitative data regarding the outcome of the simulation. This is the 3D virtual try-on process. This qualitative and quantitative data can be stored in a fit analysis object. The output of the fit analysis algorithm can also be fit data or rendered media. A consumer virtual fit can be used to determine qualitative and quantitative data for fit analysis.

The fit analysis algorithm may run a stretch test to see how much virtual fabric is stretching in consumer virtual fit. A positive stretch value could indicate tighter fitting areas. Zero or a small amount of stretch may indicate a good fit or no stretch. Negative stretch values could indicate areas of compression. One embodiment may use stretch values to determine the fit of a garment on an avatar. These data can be stored as fit data.

Various methods can be used to calculate stretch. Stretch can be measured by measuring the percentage difference between a measurement before and after the virtual fit. An example is a garment's initial measurement that might give one length. The length of the virtual fit garment measured at the same place after virtual fitting it on an avatar might change. The stretch value may be defined in one embodiment as the percentage difference in length for a specific measurement. Another embodiment may calculate the stretch value for multiple garment measurements. The total stretch of all garments or the average stretch of all garments may be used to determine the stretch value.

Quantitative data can also include the calculation of the change in the stretch in the same way as above. However, the initial value is set to the stretch size of the base size, and the final value is the stretch value for the selected size (if it is not the base size). Quantitative data can also include the calculation of the stretch value for individual points of measurement, as opposed to the whole garment. Then, the measurements are compared with the 3D virtual garment measurements from the fit model virtual fi. Quantitative data can also include the calculation of the volume between the garments and the body, and how this volume might change from one size to the next. To predict the size, all data can be combined or broken down into pieces. To determine the best fit, the decision engine might consider the total volume of the garment relative to its body. Experts in the art know that there are common methods to determine how a garment fits using specific points.

Turning back to FIG. 1A, the process selects a standard body template (26) and morph/warps the standard body template to match points of interest (28), and then selects a body-shape best matching the morphed body template (30). For example, the matching to the body can be based on key sections and girths of the body and anthropometric points.

The process can store body dimensions in a computer, a data storage device, cloud storage, or in a separate data storage facility as well as identifying information for a plurality of wearable items and data related to each wearable item. The data can include a set of internal measurements and other fit and performance parameters that may be obtained for each wearable item and imported into the data set such that a two dimensional (2D) or three dimensional (3D) representation of the wearable item may be constructed. The data set also may include feedback about the wearable items as reviewed by multiple consumers, as will be described in more detail below. For example, for a footwear model, the internal measurements can include a total length measurement, a total width measurement, heel width, arch length and arch width. When applicable, additional parameter measurements can also be stored, including, but not limited to, toe box height, forebody height, and arch height. Three dimensional measurements may be stored within the data set as well. Measurement parameters such as tapering or change in width as a percentage of total length can also be stored within the data set. It should be noted that this list of measured parameters is provided by way of example only, and additional parameters measurements may be included such as heel height, arch height, girth, body opening diameter, and any other relevant information. In additional to dimensional measurements described above, other parameter measurements may be associated with a footwear model depending on model type. For example, a miming shoe may have feature-based parameter measurements associated with stability whether or not the shoe has motion control, racing spikes, and any other relevant parameters. Tactile measurements such as cushioning, stretch and deformation also may be available for various areas in the footwear model. The system may receive these parameter measurements from one or more scanning devices that scan the footwear model and collect measurement data from the footwear model.

In one embodiment, the system captures images from all angles around the body. When the user finishes scanning her body, the plurality of images are transferred to a processor. For exemplary purposes, the processor may be on a remote server. Reconstruction and generation operations are performed on the plurality of images. An optimization is performed on the plurality of images to simultaneously determine a pose of the image capture device for each image in the plurality of images, as well as a camera matrix for the image capture device used, the camera calibration matrix or camera intrinsics, as well as one or more radial distortion parameters. The pose of the image capture device includes an X, Y, and Z location in a universal coordinate frame, which describes distances from an origin in a three dimensional coordinate system along three orthogonal basis vectors. The pose of the image capture device also includes a roll, a pitch, and a yaw, which correspond to rigid body rotations about each of the three orthogonal basis vectors. The total pose of the image capture device may be described as <x, y, z, r, p, q>, or may also be given as a translation in three dimensions plus a quaternion, or a rotation matrix and translation vector. The camera matrix includes a two-dimensional center point, a focal length in a first axis, and a focal length in a second axis. In addition, one or more radial distortion factors which describes a radial distortion associated with the plurality of images due to a lens used in the image capture device is extracted. As an alternative to a single radial distortion factor expressing, for example a fish-eye lens, a series of coefficients may be extracted which expresses additional radial distortion parameters if the lens model is a polymer. For exemplary purposes, the optimization is a non-linear least squares optimization using a series of points associated with the regular pattern of first shapes and second shapes as determined in every image. In an alternative embodiment, the camera can be equipped with a plurality of sensors. The sensors may include accelerometers, sonar, gyroscopes, magnetometers, laser range finder, and global positioning systems where the surface with the regular pattern of first shapes and second shapes is not required. In the scanning step, sensor data from the plurality of sensors is also acquired between every image captured in the plurality of images. The sensor data is also sent to the processor in the scanning step. In the reconstruction, the optimization is performed not over the series of points associated with the regular pattern of first and second shapes, but features extracted from each image in the plurality of images, as well as the sensor data. A feature conveys data which is unique to the image at a specific pixel location, such as unique image gradients or pixel intensities. For exemplary purposes, features are extracted from the images a feature extraction algorithm that encodes an input image as a feature vector, and a detection model that locates the target human bodies according to the computed vector. One embodiment extracts the Histograms of Oriented Gradients (HOG) features that are robust to significant changes in image illumination and color as well as small changes in image-contour locations and directions. Further, a combination of hog and Local Binary Patterns (LBP) can also be used.

Weighted-NMS based model fusion method It is almost impossible for a single human detection model to detect all types of human bodies precisely. For example, the person Grammar model can not detect all types of human bodies (the recall cannot reach 100%), and it can only detect some particular types that are compatible with its framework. Every model has a bias, which is rooted in its own theoretic limitation. If we do not jump out of a theory framework, it will be difficult to overcome the bias. In the previous section we combine different features and get a satisfactory progress (refer to Table 1(a)). This inspires us that, different models, especially some complementary models, can also be combined together to cross-fertilize the whole detections and suppress their respective biases.

Depth feature extraction can be done with a sparse autocoder (SAE) to detect the human body in depth images. This learning-based feature allows for the capture of the human body's intrinsic structure. Both convolution neural net and pooling can reduce the computational cost of SAE. We also aim to improve detector efficiency by learning SAE-based depth features. Based on the fact that object surfaces have similar depth values, a beyond sliding window location strategy has been proposed. To determine the size of the detection window, the proposed strategy uses the histogram to calculate candidate detection window centers. It can also avoid lengthy sliding window searches and allows for fast human body localization.

Next, the process can form codebooks of body features. Alternatively, a continuous density model can be used because it avoids any errors that could be introduced in the quantization phase. The codebook approach classifies each frame into one of N categories, each represented by canonical vector that is associated with a symbol in the code book. Once a body is classified by a codebook, can be represented by a single symbol that indicates which code value it is closest to. Code book vectors are defined by training on a training corpus of feet that minimizes the overall distortion, which is the sum of each input vectors' distance from the code book vector that it is identified with. The process iteratively improves the entire set of code book vectors using a K-means clustering algorithm where, given an initial set of N code book vectors Ci and a set of training vectors, the process performs:

Classification: Cluster the training vectors by its closest code book vector according to a distance function;

Centroid Update: Update each code book vector to be the centroid (relative to the a difference function used) of the training vectors assigned to it.

Iteration: If the improvement in overall distortion is greater than a threshold, then repeat from step 1.

Continuing in the reconstruction, once the pose of the image capture device and the camera matrix is determined for every image in the plurality of images, it is possible to estimate the depth at specific images in the plurality of images using both intensity values contained in the image as well as the image capture device pose for every image. For exemplary purposes, the depth may be acquired by a minimization of an energy defined. The minimum of the energy may be solved for by performing a Legendre-Fenchel transform and expressing the optimization in both a primal and dual variable. By expressing the problem in both the primal and dual forms, it is possible to use a primal-dual hybrid gradient approach to finding the minimum of the energy. Because a primal-dual hybrid gradient is used, the minimum may be determined by performing a primal descent and a dual ascent for every pixel in the image in parallel on a graphics processing unit (GPU). Sequential subsets of the plurality of images are used to form a depth image, wherever a depth image is desired, by first determining the inverse depth for every pixel in the cost volume which maps to the lowest cost. Once a minimum is estimated, a dual ascent is performed in dual step, a primal ascent is performed in a primal step and an update is performed in an update step. In the update step, a similar search through the cost volume is performed as in the depth estimate, however the search is augmented by the difference of the primal variable with the slack variable, squared, divided by twice the mediation variable. The dual step, primal step, and update step are repeated until a stopping criterion is reached. For exemplary purposes, the stopping criterion is reached once the mediation variable is reduced below a threshold or a change in the energy computed is below a certain threshold. Once the stopping criterion is reached, the depth at every pixel calculated is stored in a depth image.

Alternatively, a buffer of a predetermine number of frames is created from a video sequence. If a previous depth image is known (determined via the previous depth estimate or by raycasting a truncated signed distance function storing a fusion of previous depth estimates), the full pose of the image capture device for every image is updated by performing dense tracking using the previous depth estimate, image taken at the previous depth estimate, and a current image. Dense tracking calculates the pose by performing a minimization with respect to the pose of a reprojection error between the previous image, the previous depth, and the current image using every pixel of both images.

Once the cost volume is calculated, a depth per frame is calculated by first performing a minimum search along every inverse depth element for every pixel in the cost volume. This rough depth estimate is then smoothed using a weighted Huber regularizer via the same primal-dual hybrid gradient optimization schema as above. To further increase the accuracy of the depth estimates, the output of the optimization is used to initialize a wide baseline polishing step. In this wide baseline polishing step. a linearization of reprojection errors from the reference image of four additional frames further from the reference frame than the 20 frame selected subset, but within 80 cm of the reference frame, is regularized with a similar weighted Huber regularizer and minimized using a primal-dual hybrid gradient approach yielding a depth image. All of the depth images form a series of depth images. Since the pose of the device is known relative to the surface, it is possible to remove all information from the depth image that is at or below the surface. This leaves only the body object in an updated depth image. The series of updated depth images may be stored in a volumetric representation of depth. For exemplary purposes, the volumetric representation of depth is a signed distance function. Each depth image is then loaded into the signed distance function representation. A model is formed using the volumetric representation of depth and stored in a model file. For exemplary purposes, the model file is a mesh. Further, it is contemplated that the model file is created from the volumetric representation of depth. One such volumetric representation of depth is a signed distance function. Alternatively, a truncated signed distance function may be used. Once every image is acquired, it is fused into the signed distance function. The model file may be extracted from a signed distance functions by such algorithms as marching cubes, marching tetrahedral, or Poisson reconstructions.

Although the foregoing discusses phone-based cameras, other consumer cameras that work with a desktop computer can be used. In one embodiment the Microsoft Kinect camera can be used, while in another embodiment, a 3D camera such as the Intel RealSense uses three components: a conventional camera, a near-infrared image sensor, and an infrared laser projector. Infrared parts are used to calculate the distance between objects, but also to separate objects on different planes. In one embodiment, a processor to translate the edges as mouse movement and mouse clicks to control the vehicle by moving hands. They serve for facial recognition as well as gesture tracking.

Figure 4:
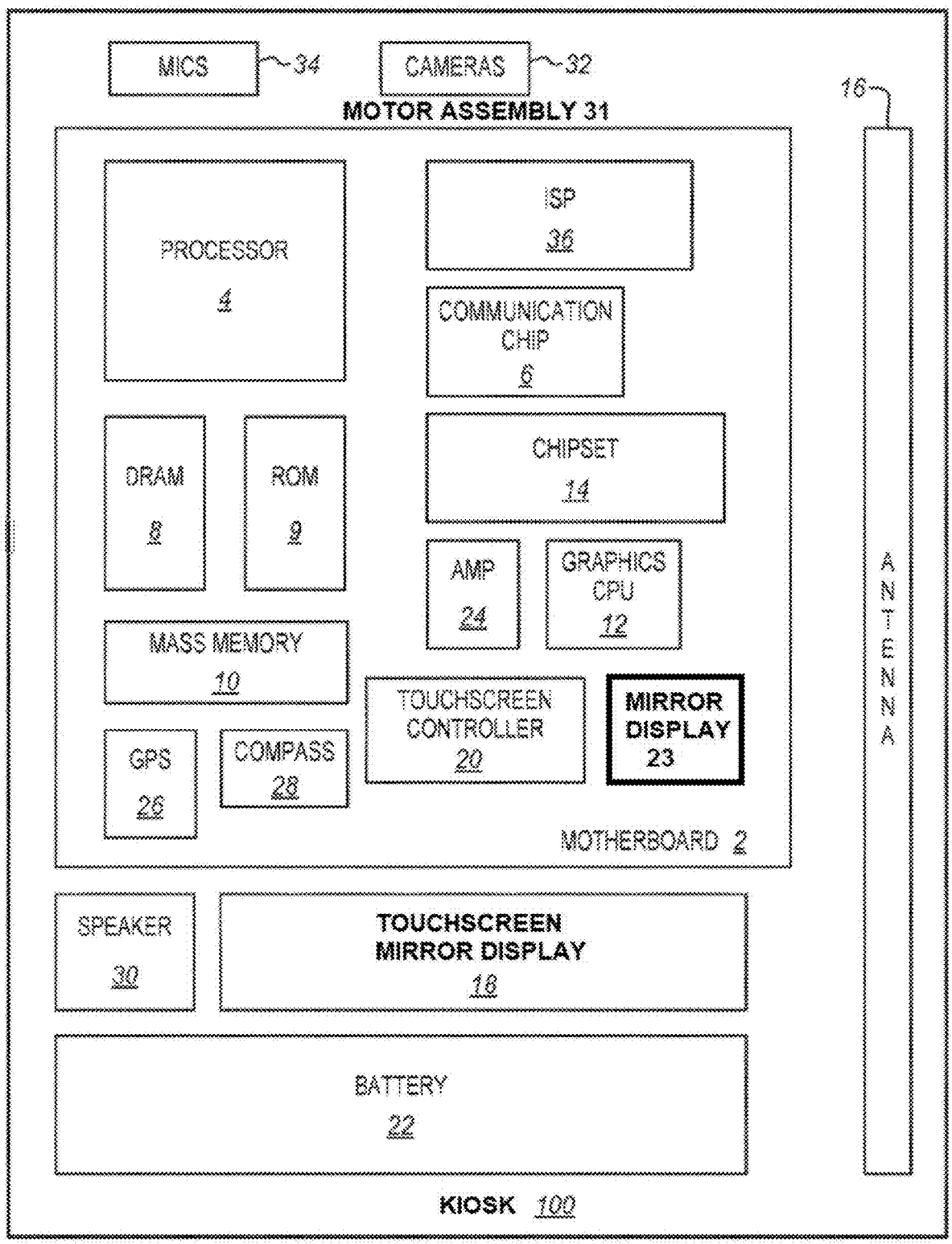
FIG. 4-5 show exemplary processing circuit for a motorized mirror display with touchscreen and with depth-sensing camera(s).

FIG. 4 shows a kiosk system 100 according to one implementation. The kiosk 100 houses a system board 2. Board 2 can contain a variety of components, including a processor 4 and one or more communication packages 6. The communication package is connected to one or more antennas 16. Board 2 is electrically and physically coupled to processor 4.

Kiosk 100 can include additional components depending on the application. Other components may include volatile memory (e.g. DRAM) 8, flash memory (not shown), a digital signal processing (not shown), an antenna (16), a display (18), such as a touchscreen, a controller 20 and a battery 22. A power amplifier 24. A global positioning system (GPS), 26. An accelerometer (not show), 32-megapixel camera array 34. And a mass storage device (such as a hard disk drive), compact disk (CD), digital versatile disc (DVD), and so on (CD), digital versatile disk (DVD), digital versatile disks (DVD), digital versatile disk (DVD), digital disk (DVD), These components can be connected to the 2 system board or mounted to it.

Communication package 6 allows wireless and/or wired data transfer to and from kiosk 100. The term "wireless" can be used to refer to circuits, devices, and systems that transmit data using modulated electromagnetic radiation via a non-solid medium. Although the term implies that there are no wires in the devices, it does not mean they do not have them. The communication package 6 can implement any number of wired or wireless standards or protocols. A plurality of communication packages 6 can be included in the kiosk 100. A first communication package 6 could be used for short range wireless communications like Wi-Fi or Bluetooth, while a second package 6 might be used to provide long range wireless communications such GPS, EDGE, 5G/6G, and GPRS.

Cameras 32 have image sensors equipped with the autofocus lens systems described herein. An image processing chip 36 may be used by the image sensors to read and convert data, code and decode, and perform 3D mapping and noise reduction. To drive the processes and set parameters, the processor 4 can be coupled to the image processing chips 36.

The kiosk 100 can be any combination of a laptop, netbook, notebook, ultrabook, smartphone, tablet, personal digital assistant (PDA), a ultramobile PC, a desktop computer or a laptop. It may also include a scanner, printer, scanner, a monitor and a set-top box. One can have the computing device fixed, portable or wearable. Further implementations of the kiosk 100 could include any other electronic device that processes information.

Figure 5:
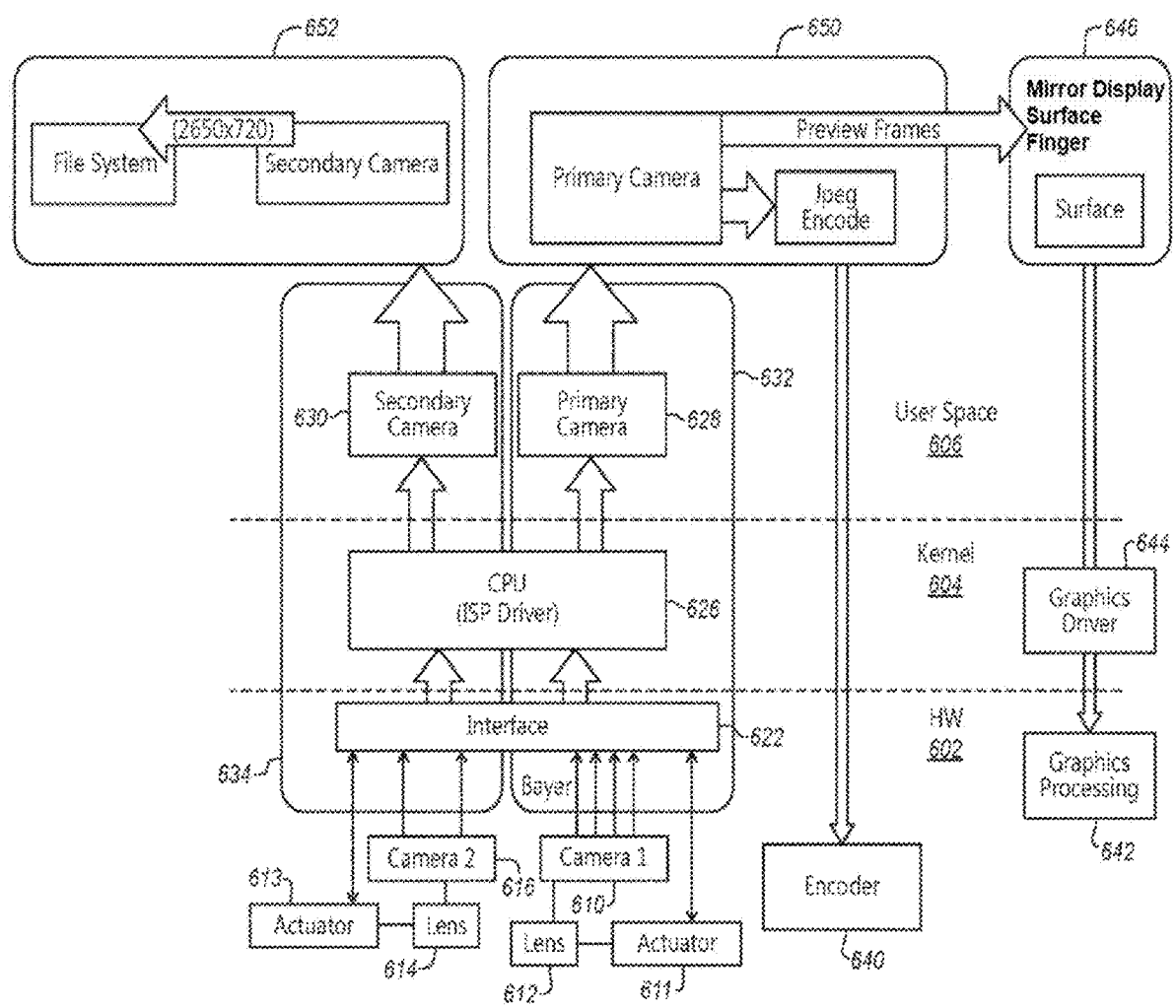

FIG. 5 illustrates a diagram of an example of a software stack for a 2-camera system, such as the one in FIG. 6. The hardware layer foundation 602 is the basis of the software stack. The hardware layer is covered by a kernel layer 604, and a user space 606. The hardware layer comprises a primary camera 610, coupled to an interface 642 to an ISP or central processing unit (CPU) 626. The CPU is responsible for operating the graphics driver 644 to the ISP. The secondary camera 616 can also be connected to the interface 622 and main image signal processor 66. Through a different port, the main ISP is connected to the ISP graphics driver. To allow the system's switch between the front and rear cameras, a front camera (not shown), may be connected to the CPU 626.

An actuator 611 controls the primary camera 610. The kernel level interface connects the actuator to the ISP. The secondary camera 616 also has a lens system 644 controlled via an actuator 613, which is coupled to the ISP's interface.

Some implementations of the processor are coupled to the actuators of the primary and second auto focus cameras to control the voltage that is applied to each camera's cavity. The voltage controls the shape and size of the deformable optical elements. Other embodiments of the actuator are coupled to the voice coil motor for a telecentric lens or any other lens with little or no focus breathing.

The kernel level is where the CPU 626 and the graphics driver 64 receive the image sensor data from cameras and transmit it to the user area. The first 650 and the second 652 camera system are found in the application layer. The primary camera system supports preview and encoding. A display 646 receives the preview features. The hardware layer sends the encoding to a hardware encoder 640.

Secondary camera systems support file storage to be used by image processing to create depth data or to support other applications. The display support is illustrated with a hardware-level graphics processor 642, and a kernel-level graphics driver 64 to provide graphics. A user input system may include buttons, keys, and a touchscreen interface in 646. There are also a number of input systems that provide commands from the user space to kernel layers.

To provide more depth information, frame synchronization can be used between cameras. Frame counters may be used to synchronize the frames. An hardware connection can be used to enable frame synchronization. This will allow each camera to start frames where the primary camera is driving the secondary camera.

The system can include determining depth with two fixed focus cameras. This method can be used to determine the depth cameras without taking into account the reference camera. This method doesn't allow for focal length changes with focus distance, so it is not suitable for telecentric lens systems or lens systems that have deformable elements. The system includes a left camera and a right ca. The cameras are referred to as left or right, but they can be separated or placed in different directions. Although only one camera is being discussed, it's possible to have additional cameras. One camera could be the primary, so each camera can be compared to it for depth determination. Or the results of all the cameras may be compared in other ways. Both the left and right cameras produce left and right images, respectively. These images are then buffered for further processing. Each image is then applied to a rectification module. The buffered images of the respective corrected left or right images will then be applied. After the calibration, the images are corrected by rectification. The two cameras are connected to a calibration module which compares the field at the current focal distance. This comparison allows for the development of calibration parameters for either one or both cameras. The rectification module applies these parameters. The calibration module detects distortions and aberrations in the images. The rectification module scales either one or both images to ensure that the field-of-view matches. To produce the corrected images, the images are merged onto the same plane.

The system can apply any one of many processes to the image after it has been corrected, depending on its intended use model and user experience. A depth map is created in this example. However, any other process can be used instead. The primary camera is the left camera. You can choose any camera. The buffer is used to provide the rectified left image. The module can identify objects using any approach. This can be done by using centroid detection or edge detection.

In this example, the object identification software module first identifies objects. The left centroids module then determines the centroids of the identified objects. The centroids are applied to the corrected right image using a correspondence module. The right and left images correspond to each other. These objects have been identified in the left image. The centroids for these objects can be found in the right photo in a right centroids module.

Triangulation can be used to determine distance to an object using the established centroids for the two images. To create a depth map, all distances are compiled in a depth module. The system can use the depth map to perform additional operations, such as to calculate other dimensions and distances, apply effects, combine images with left or right images, or any other required additional operations.

Triangulation can be done in a number of ways. A sum of absolute differences can be used to identify objects in a disparity-based depth estimation. The image of the object on the left sensor and the right sensor are used to identify it. To determine the edges and centroids of an object captured on two images, the intensity of surrounding pixels and the likely pixels of the object are compared. The distance between the sensor image plane and the location of the object can be determined by comparing the differences in the object's position between the images.

These examples are only a few of the many possible embodiments. One can combine the various features of different embodiments, with some features being included and others being removed to suit different applications. A number of embodiments relate to an imaging device that includes an auto-focus camera for capturing an image at a first distance. The primary camera has a fixed view through various focus distances. A secondary auto-focus camera is used to capture the same scene at another distance. A processor with a port to the primary and secondary cameras to receive images from them. This allows the processor to calculate a depth map from the secondary camera image and create a depth map from the primary image.

Further embodiments include a lens system with a deformable optical component. Other embodiments of the deformable element include an optical membrane within an oil-filled cavity. The membrane is subject to movement by the oil-induced voltage, which causes it to change shape.

Further embodiments of the processor are to create a depth map by recognizing objects on a primary camera photo, then finding the corresponding objects on a secondary camera image. Then, the processor will determine the positions of the objects and perform triangulation using these positions to determine the distance to each object.

Another embodiment includes a third autofocus camera with a higher resolution to capture the same scene. To determine a depth map, the depth map must be compared to the image taken by the third camera.

A number of embodiments relate to an apparatus that includes a primary means for photographing a scene at an initial focus distance. The first image means have a fixed view through various focus distances. The second means for capturing the same scene at another focus distance. There is also a port for receiving images from the first picture capturing mean and also to the second imaging means. This allows the secondary image capturing to be used to create a depth map of an image taken from the first photo capturing. Further embodiments have the first and second image-capturing means having an autofocus lens system with a deformable optical component.

Embodiments can be made using the cameras 32 in conjunction with the processors 4, 36 and any other components that may be needed. This includes one or more memory chips and controllers, CPUs (Central Processing Unit), microchips and integrated circuits interconnected via a motherboard, an ASIC (application specific integrated circuit) and/or a field-programmable gate arrays (FPGA).

In one embodiment to create an avatar, the process takes digital photos of the consumer's body using a webcam, or any other digital camera. Three photographs (front, back, and side) are required to create an avatar. The digital photos can be sent to the avatar software. The digital photographs can then be mask. This will remove all other objects from the image. You can do this using MATLAB software or PHOTOSHOP from Adobe Systems Incorporated (345 Park Avenue San Jose, Calif. 95110-2704), or any other image editing software. The base avatar mesh is sculpted. Digital photos can be used as reference to match the avatar's shape to the Real person. These photographs can then be mapped in 3DS MAX to planes and placed around the mesh of the base avatar. It is possible to refer to photographs to determine the shape of the body being digitally reproduced. If the photo is front-facing, the mesh of the base avatar is also front-facing. The base avatar's shape targets are then adjusted to match the silhouette in the reference image. Next, the mesh of the base avatar is adjusted using soft selection techniques to ensure that the dimensions and references are accurately matched. To correct any errors in the photographs, digital adjustments are made to the photographs of the back, sides, and front of the body when using them as references.

To model the face of a consumer, close-up images such as those showing a front profile, left profile and right profile of the consumer body/fit model body can be taken and sent the avatar software A 3D mesh can be created of the head and added to either the consumer avatar OR the fit model avatar.

Next, the process might include the virtual fitting of the 3D virtual clothing onto a consumer avatar using an automated web process or computing device. This will result in consumer virtual fit. The consumer can choose to virtual try-on the 3D virtual garment. A graphical user interface (GUI), which can be used on a computing device, or sent over the internet via a website, allows the consumer to request to try-on 3D virtual clothing.

One embodiment allows the consumer to send an email request via the internet to try on a garment. The hyperlink can be clicked by the customer. It may reside in the retailer's online shop or a third-party store. A hyperlink can be placed next to a display displaying a 3D virtual clothing or a digital representation a production sample garment for virtual fitting.

A fit analysis algorithm may run a stretch test to see how much virtual fabric is stretching in consumer virtual fi. A positive stretch value could indicate tighter fitting areas. Zero or a small amount of stretch may indicate good fit or no-stretch. Negative stretch values could indicate areas of compression. One embodiment may use stretch values to determine the fit of a garment on an avatar. These data can be stored as fit data.

There are many ways to calculate stretch. Stretch can be measured by measuring the percentage difference between a measurement before and after the virtual fit. An example of this is a garment's initial measurement that might give one length. The length of the virtual fitd garment measured at the same place after virtual fitting it on an avatar might change. The stretch value may be defined in one embodiment as the percentage difference in length for a specific measurement. Another embodiment may calculate the stretch value for multiple garment measurements. The total stretch of all garments or the average stretch of all garments may be used to determine the stretch value.

Quantitative data can also include the calculation of the change in stretch in the same way as above. However, the initial value is set to the stretch size of the base size and the final value the stretch value for the selected size (if it is not the base size). Quantitative data can also include the calculation of the stretch value for individual points of measurement, as opposed to the whole garment. Then, the measurements are compared with the 3D virtual garment measurements taken from the fit model virtual fit 186. Quantitative data can also include the calculation of the volume between the garments and the body, and how this volume might change from one size to the next. To predict size, all data can be combined or broken down into separate pieces. To determine the best fit, the decision engine might consider the total volume of the garment relative to its body. Experts in the art know that there are common methods to determine how a garment fits using specific points.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Referring to "one embodiment", "an embodiment", "example embodiment", or "various embodiments" may indicate that certain features, structures or characteristics might be present in the embodiment(s). However, not all embodiments will include these features, structures or characteristics. Some embodiments may include all or some of the features that are described in other embodiments.

The following claims and descriptions may include the term "coupled" as well as its derivatives. The term "coupled" can be used to indicate that two or three elements interact or co-operate with one another, although they may have interdependent physical or electrical components.

The claims use the ordinal adjectives "first", "second", third, etc. to describe a common element. They do not imply that elements must be described in a particular order, temporally, spatially or in ranking.

Examples of embodiments are shown in the drawings and the description. Of course, one or more elements are combined into a single element. You can also split certain elements into multiple functional elements. One embodiment could contain elements that are not found in another. You can change the order of processes herein. They are not restricted to the way described herein. The actions in any flow diagram do not have to be executed in the same order as shown. The software can also perform acts that are independent of other acts in parallel to the others. These examples are not intended to limit the scope of embodiments. There are many variations possible, regardless of whether they are explicitly stated in the specification. The claims below indicate the scope of embodiments.

What is claimed is:

1. A system, comprising:
    a kiosk including:
        a mirror display;
        a depth camera coupled to the display;
        a touchscreen sensor coupled to the display;
        a proximity sensor;
        a radio frequency identification (RFID) module; and
        a processor coupled to the mirror display, the depth camera, the touchscreen sensor, the proximity sensor, and the RFID module to interact with a user; and computer readable code executed by the processor to generate a dimensionally accurate body avatar with a virtual good and wherein the virtual good comprises one of: swords, coins, potions, and avatars.

2. The system of claim 1, comprising code executed by the processor to:
instruct the user to stand at a pre-determined location;
sweep a depth-camera around the user and capturing 3D data therefrom; and
generate a dimensionally accurate body avatar.

3. The system of claim 1, comprising code to render the body avatar with a selected garment.

4. The system of claim 1, comprising code to render the body avatar in a game.

5. The system of claim 1, comprising code to render the body avatar with a virtual good.

6. A system, comprising:
a kiosk including:
a mirror display;
a depth camera coupled to the display;
a touchscreen sensor coupled to the display;
a proximity sensor;
a radio frequency identification (RFID) module; and
a processor coupled to the mirror display, the depth camera, the touchscreen sensor, the proximity sensor, and the RFID module to interact with a user; and
computer readable code executed by the processor to generate a dimensionally accurate body avatar and code to render the body avatar with a virtual good, wherein the virtual good comprises one of: swords, coins, potions, and avatars.

7. The system of claim 1, comprising code to augment user decision making on the mirror display.

8. The system of claim 1, comprising code to render avatars tailored to utilities and functionalities such as dimensions to scale that allow for accurate sizing of clothing and accessories.

9. The system of claim 1, comprising code to immerse the user in a virtual reality game.

10. The system of claim 1, wherein the user is instructed on where to stand and when the scan has commenced, the user rotates or position a user body until the proper scan is completed.

11. A method to generate an avatar with a kiosk having a mirror display; a depth camera coupled to the display; a touchscreen sensor coupled to the display; a proximity sensor; a radio frequency identification (RFID) module; and a processor coupled to the mirror display, the depth camera, the touchscreen sensor, the proximity sensor, and the RFID module to interact with a user, the method comprising:
instructing the user to stand at a pre-determined location;
sweeping a depth-camera around the user and capturing 3D data therefrom; and
generating a dimensionally accurate body avatar with a virtual good and wherein the virtual good comprises one of: swords, coins, potions, and avatars.

12. The method of claim 11, comprising buying a virtual garment and rendering the garment over the body avatar.

13. The method of claim 11, comprising buying a virtual good and displaying the virtual good and the body avatar.

14. The method of claim 11, wherein a user completes a registration from scratch and generates a customized avatar, wherein the user logins by scanning a unique QR code from the kiosk. Once authenticated, users will be prompted to create their avatar, and the depth camera to create an accurate representation of the user's face or body and replicate that onto the avatar for use in the platform.

15. The method of claim 11, comprising automatically detecting a body posture and capturing multiple depth images.

16. The method of claim 11, comprising processing data from the depth camera to obtain a 3D whole-body contour.

17. The method of claim 11, comprising processing data on a web-based backend for metric aggregation, health monitoring, and rendering marketing content.

18. The method of claim 11, comprising applying a deep learning machine to data from the kiosk that pre aggregates and categorizes data, further comprising analyzing the data by setting filters and data parameters.

19. A system, comprising:
a kiosk including:
a mirror display;
a depth camera coupled to the display;
a touchscreen sensor coupled to the display;
a proximity sensor;
a radio frequency identification (RFID) module; and
a processor coupled to the mirror display, the depth camera, the touchscreen sensor, the proximity sensor, and the RFID module to interact with a user; and
computer readable code executed by the processor to generate a dimensionally accurate body avatar with a virtual good; and a deep learning machine processing data from the kiosk by pre-aggregating and categorizing data, and analyzing the data by setting filters and data parameters; and
the virtual good comprises one of: swords, coins, potions, and avatars.

* * * * *